Jan. 11, 1955 B. AMOS ET AL 2,699,497

TELEVISION RECEIVER

Filed June 22, 1950

INVENTORS
BERNARD AMOS
NICHOLAS DE FALCO
BY Darby & Darby
ATTORNEYS 2,699,497
Patented Jan. 11, 1955

2,699,497

TELEVISION RECEIVER

Bernard Amos, North Arlington, and Nicholas De Falco, Upper Montclair, N. J., assignors to Allen B. Du Mont Laboratories, Inc., Clifton, N. J., a corporation of Delaware Application June 22, 1950, Serial No. 169,658

1 Claim. (Cl. 250—20)

Figure 1:
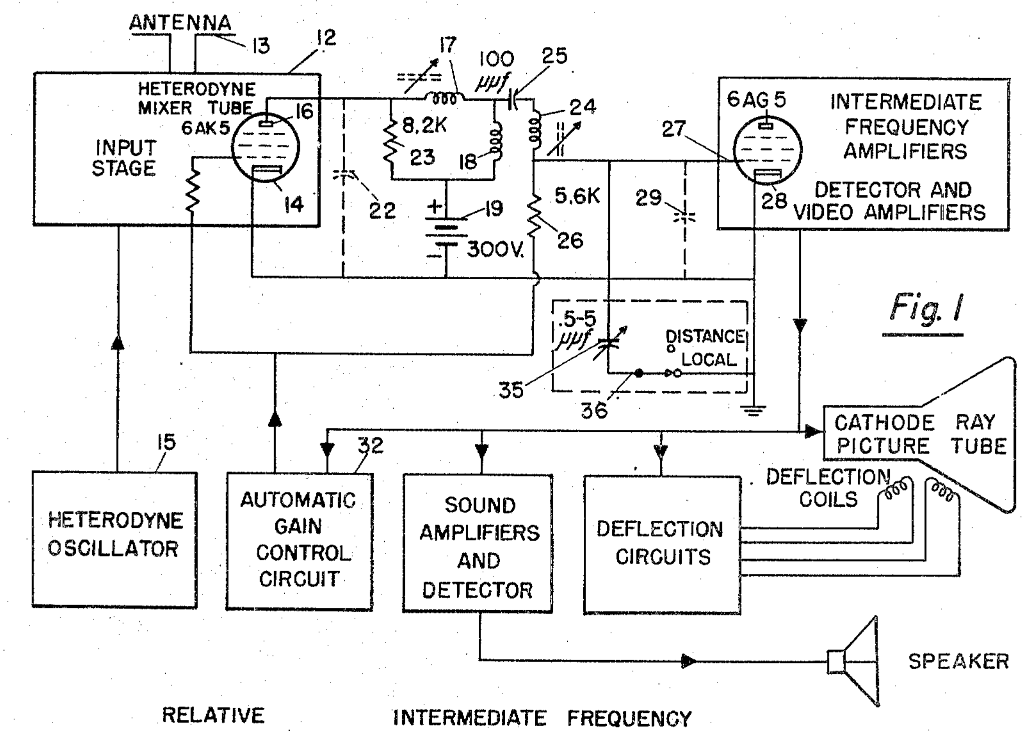

The present invention relates to receivers of radiant energy such as television receivers and to apparatus for improving the signal-to-noise ratio thereof.

Television receivers in general use are selectively tunable to a plurality of transmitting stations, the receivable electromagnetic signals from which are sometimes weak and sometimes strong. In order that both weak and strong signals may be received, a receiver is provided with a gain control, usually automatic in action, so that the gain of the receiver may be varied over a wide range. With receivers now in general use, an undesirable effect of the change in gain is a corresponding change in the selective characteristics of the controlled amplifiers, known as space charge and Miller effect detuning.

It is usual practice to employ television receivers of the superheterodyne type in which the local oscillator operates higher in frequency than the received signal and the resulting intermediate frequency signal is amplified in a selective stage in which the picture signal carrier is located on a sloping portion of the response characteristic, modulation components lower in frequency than the carrier being amplified more than higher frequency moduation components.

If a television receiver is aligned to receive strong signals, with the picture carrier and low modulation frequencies being amplified at approximately 50 per cent of the amplification of lower frequencies in the intermediate frequency range, as is the usual practice, the direction of space charge and Miller effect detuning is such that when weak signals are received, the amplification of the carrier and lower frequency modulation components becomes appreciably less than the recommended 50 per cent value. This results in a picture signal which after amplification in the receiver contains more thermal noise from the input circuits and thermionic tubes than would be the case if space charge and Miller effect detuning did not occur.

It is an object of this invention, accordingly, to provide a television receiver in which undesired detuning is compensated.

It is another object to provide a receiver in which an improvement of signal-to-noise is effected for a wide range of signal strengths.

It is a third object to provide a receiver capable of receiving signals covering a wide range of intensity or signal strength.

Other objects and advantages of the invention will in part be obvious and in part appear hereinafter.

In accordance with the invention a change of tuning of the selective circuits is provided which is in a direction opposite to that of the undesired detuning, to compensate for the undesirable changes thereof by increasing the gain at frequencies approximating that of the picture carrier signal. The effect is accomplished in the receiver by incorporating in the circuit of the intermediate frequency amplifier auxiliary elements including a variable capacitor and a switch to make it possible to employ these elements in combination with distributed capacitance of the circuit to increase the gain of the amplifier at frequencies approximating the picture carrier signal.

Figure 2:
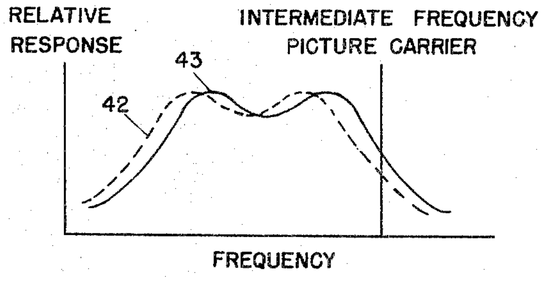
Figure 3:
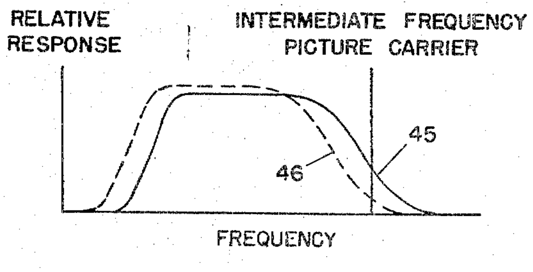

In the accompanying drawings:

Figure 1 is a receiver embodying the invention, the receiver being shown partly schematically and partly in block form; and Figure 2 and Figure 3 illustrate amplitude response of portions of the receiver of Figure 1, plotted against frequency.

In the receiver shown in Figure 1, an input stage 12, connected to an antenna 13 contains a heterodyne mixer tube 14 receiving a heterodyne signal from a local oscillator 15 and having an output electrode or plate 16. The output electrode 16 is connected in series with a primary inductance 17, tunable by means of a slug, a coupling inductance 18 and a source of direct potential 19, this source being at intermediate frequency ground potential. The inductances 17 and 18 are in parallel with the capacitance-to-ground of the tube 14 and other circuit elements. This capacitance-to-ground is shown in broken lines as a capacitor 22 forming a tuned primary circuit resonant at a frequency of approximately 24.25 megacycles. A primary damping resistor 23 is connected in parallel to the inductors 17 and 18.

A secondary slug tuned inductance 24 is connected to the coupling inductance 18 through a blocking capacitor 25 and to a secondary damping resistor 26. Grid 27 of intermediate frequency amplifier tube 28 is connected to the junction of the inductance 24 and the damping resistor 26. The capacitance to ground of the grid 27 and other secondary circuit elements is represented as a capacitor 29 shown in broken lines. These capacitances are parallel resonant with the inductances 18 and 24 at a frequency of approximately 24.25 megacycles, the primary and secondary circuits forming a two-mesh coupled circuit familiar in the art.

The gain of the amplifier tube 28, in common with other amplification stages in the receiver, is controlled by means of bias voltage from an automatic gain control voltage source 32 applied to its grid. In this stage the gain control voltage source is connected to the resistor 26.

A variable reactive element comprising a capacitor 35 and a switch 36 are connected in series between the grid 27 and ground, and hence in parallel with the tuned secondary circuit. The position of the switch 36 shown is the "Local" position in which the circuit is closed. The alternate is the "Distance" or open position of the switch.

In Figure 2 is shown a dotted curve 42 representing the amplitude vs. frequency response of the intermediate frequency amplifier stage shown, this being the relative gain between the plate of the tube 14 and the grid of the tube 28 with the switch 36 in the "Local" position. A second curve 43 representing the response in the "Distance" position of the switch 36 is similar to the first curve but is higher in frequency.

In Figure 3 the solid curve 45 shows the overall response curve of the receiver plotted for the sake of comparison against the intermediate frequency scale, when the receiver is properly aligned with an input signal of, for instance, 1000 microvolts. It will be noted that the response curve is dissymmetrical in that the picture carrier frequency of 24.25 megacycles falls on the sloping side of the curve at a point of approximately 50 per cent response. The second curve 46 drawn in broken lines shows the response of the same receiver when the gain of the receiver changes to receive a weak signal of for instance 50 microvolts. This detuning is caused by space charge and Miller effect, increasing the apparent input capacitance of the gain controlled tubes with increased gain and hence lowering the frequency of the intermediate frequency pass band. A comparison of the two curves shows that the intermediate response curve is lower in frequency than before and that the picture carrier frequency appears on the sloping side of the response curve at a point of approximately 10 per cent response.

There are several undesirable effects resulting from this sliding down of the carrier having to do with poor amplitude and phase response. However, for operation with weak signals the most serious effect has to do with noise. In any type of receiver thermal noise occurs in each amplifier stage and in each tube, and forms an effective limit to the amount of sensitivity possible. In a well designed television receiver operating at full gain each stage has sufficient gain to keep its noise low compared to the noise accompanying the signal. Under these conditions most of the noise observable in a picture originates in the input stage before the mixer tube. A loss in gain in any of the early stages therefore, adds to the noise present in a receiver and prevents satisfactory operation in weak signal areas. The noted sliding down of the carrier, therefore, tends to increase the apparent noise of a receiver by reducing the gain of low frequency modulation components. The signal, once it becomes associated with thermal noise, is irretrievable from it, since both noise and signal will be amplified together in subsequent stages.

In accordance with the invention, therefore, these undesirable effects are compensated by the use of the auxiliary circuit including capacitor 35 and switch 36.

By way of example, assume a receiver has been properly aligned to receive a strong signal with the switch 36 set at "Local," to give the response curve 45. A weak station is then tuned in. As the gain of the receiver is increased to receive the weak signal, the input capacitances of the grid circuits increase, lowering the frequencies of the associated secondary circuits, so that the overall response curve becomes the undesired curve 46. When the switch 36 is then shifted from "Local" to "Distance," the capacitor 35 is disconnected from the secondary tuned circuit shown, thereby raising the resonant frequency, and causing the response of the signal stage to shift from the curve 42 to the curve 43 as shown in Figure 2. This causes the overall response curve of Figure 3 to shift from the undesired response 46 to the desired response 45, thereby compensating for the undesired effects, so that the carrier remains at 50 per cent response and above thermal noise.

A preferred method of aligning the receiver shown comprises the following steps: First the switch is set at "Local," the capacitor 35 is set in the middle of its range, and with a strong input signal of approximately 50,000 microvolts connected to the antenna the receiver is aligned to a proper phase and amplitude response, as represented by the curve 45. Next the switch is set at "Distance" and with a weak alignment input signal of approximately 50 microvolts, the inductance 24 is adjusted to give the proper response. Finally the switch is changed to "Local," a strong input signal is introduced, and the capacitor 35 is adjusted until the proper response is again obtained.

Although a specific embodiment of our invention has been shown and described, the scope of our invention is not limited thereto, but rather is limited in accordance with the extent delineated in the following claim.

What is claimed is:

A circuit for radio frequency signals, comprising, a source of said signals, an electronic amplifier tube having input electrodes connected to said source to receive said signals therefrom, a source of variable bias voltage connected to said input electrodes, an internal input capacitance within said tube between said input electrodes which is subject to a given change in value when said bias voltage is varied a given amount, a compensating capacitance element having a value equal to the said given change in value of said internal capacitance, and switching means for selectively connecting said compensating capacitance element between said electrodes to compensate for decrease in value by said given amount of the said internal capacitance within the tube.

References Cited in the file of this patent

UNITED STATES PATENTS

| | | |
|---|---|---|
| 2,037,498 | Clay | Apr. 14, 1936 |
| 2,201,325 | Tellegen et al. | May 21, 1940 |
| 2,243,921 | Rust et al. | June 3, 1941 |
| 2,425,968 | Tunick | Aug. 19, 1947 |
| 2,540,532 | Koch | Feb. 6, 1951 |